(12) United States Patent
Komuro et al.

(10) Patent No.: US 7,652,118 B2
(45) Date of Patent: Jan. 26, 2010

(54) POLYCARBOSILANE AND METHOD FOR PRODUCING SAME

(75) Inventors: Katsuhiko Komuro, Utsunomiya (JP); Hiroshi Suzuki, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 162 days.

(21) Appl. No.: 11/572,178

(22) PCT Filed: Jul. 15, 2005

(86) PCT No.: PCT/JP2005/013184
§ 371 (c)(1),
(2), (4) Date: Jul. 3, 2007

(87) PCT Pub. No.: WO2006/009123
PCT Pub. Date: Jan. 26, 2006

(65) Prior Publication Data
US 2007/0299232 A1    Dec. 27, 2007

(30) Foreign Application Priority Data
Jul. 16, 2004    (JP)    ............................ 2004-210428

(51) Int. Cl.
*C08G 77/00*    (2006.01)
*C08G 77/60*    (2006.01)
(52) U.S. Cl. ............................. 528/35; 528/12; 528/25
(58) Field of Classification Search .................... 528/35
See application file for complete search history.

(56) References Cited
U.S. PATENT DOCUMENTS
2,628,243 A * 2/1953 Barry et al. .................. 556/466

(Continued)

FOREIGN PATENT DOCUMENTS
JP    37 15500    9/1962
(Continued)

OTHER PUBLICATIONS
Data Sheet E74a from Pall Corporation, Microlithography purifier.*
(Continued)

*Primary Examiner*—Randy Gulakowski
*Assistant Examiner*—Robert Loewe
(74) *Attorney, Agent, or Firm*—Oblon, Spivak, McClelland, Maier & Neustadt, L.L.P.

(57) ABSTRACT

An object of the present invention is to provide polycarbosilane which is excellent in solubility in general-purpose organic solvents, and heat resistance, and a method for producing the same. Polycarbosilane of the present invention comprises the following repeated unit [1]. Polycarbosilane may further comprise the following repeated unit [2] and, in that case, a content of the repeated unit [1] is preferably not less than 20 mol % relative to 100 mol % of a total of the repeated unit [1] and the repeated unit [2].

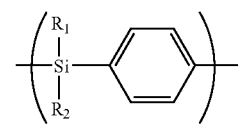

[1]

(wherein $R_1$ represents an C1-C6 alkyl group, $R_2$ represents an alkyl group having 2 or more carbon atoms, and $R_1$ and $R_2$ may be the same or different)

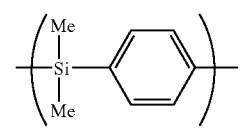

[2]

(wherein Me represents a methyl group).

16 Claims, 1 Drawing Sheet

U.S. PATENT DOCUMENTS

| | | | | |
|---|---|---|---|---|
| 4,100,233 | A * | 7/1978 | Yajima et al. | 264/625 |
| 4,127,411 | A * | 11/1978 | Yajima et al. | 75/236 |
| 4,820,788 | A * | 4/1989 | Zeigler | 528/33 |
| 5,039,593 | A * | 8/1991 | Zeigler | 430/313 |
| 5,455,367 | A * | 10/1995 | Klein et al. | 556/474 |
| 5,500,127 | A * | 3/1996 | Carey et al. | 210/685 |
| 5,527,850 | A * | 6/1996 | Katayama et al. | 524/434 |
| 5,578,103 | A * | 11/1996 | Araujo et al. | 65/60.5 |
| 6,072,016 | A * | 6/2000 | Kobayashi et al. | 528/15 |
| 6,596,833 | B2 * | 7/2003 | Ikenaga | 528/12 |
| 2002/0198353 | A1 * | 12/2002 | Chen et al. | 528/10 |
| 2003/0089903 | A1 * | 5/2003 | Nakata et al. | 257/40 |
| 2005/0282021 | A1 * | 12/2005 | Yamashita et al. | 428/446 |
| 2006/0263702 | A1 * | 11/2006 | Yamashita et al. | 430/5 |

FOREIGN PATENT DOCUMENTS

| | | |
|---|---|---|
| JP | 58-55007 | 4/1983 |
| JP | 62 025744 | 2/1987 |
| JP | 62-25744 | 2/1987 |
| JP | 3-198061 | 8/1991 |
| JP | 03 198061 | 8/1991 |
| JP | 4-318821 | 11/1992 |
| JP | 04 318821 | 11/1992 |
| JP | 04 342726 | 11/1992 |
| JP | 4-342726 | 11/1992 |
| JP | 5-323330 | 12/1993 |
| JP | 05 323330 | 12/1993 |
| JP | 8-125249 | 5/1996 |
| JP | 08 125249 | 5/1996 |

OTHER PUBLICATIONS

Certified English-language translation of JP-04342726 provided by the McElroy Translation Company.*

* cited by examiner

POLYCARBOSILANE AND METHOD FOR PRODUCING SAME

CROSS REFERENCE TO RELATED APPLICATION

This application is a 371 of PCT/JP05/013184, filed on Jul. 15, 2005, and claims priority to Japanese Patent Application No. 2004-210428, filed on Jul. 16, 2004.

TECHNICAL FIELD

The present invention relates to a polycarbosilane having excellent solubility relative to general-purpose organic solvents and excellent heat resistance, and a method for producing the same.

BACKGROUND ART

Poly(dimethylsilylenephenylene) in which a polymeric main chain consists of a repeated structure containing a silicon atom and an aromatic ring is known as a heat-resistant material (e.g. Yamaguchi et al., "KOUBUNSHIKAGAKU" [29] p. 546 and p. 665 (1972) ed. by The Society of Polymer Science, Japan).

In addition, a process for producing poly(dimethylsilylenephenylene) is disclosed, for example, in JP-A-58-55007.

DISCLOSURE OF THE INVENTION

Problems to be Solved by the Invention

In order to positively expand a heat-resistant material such as poly(dimethylsilylenephenylene) in an electronic material, it is necessary that solubility in general-purpose organic solvents is high.

However, poly(dimethylsilylenephenylene) has a problem that it has high crystallizability due to possession of a rigid main chain, exhibits solubility only in a chlorine-based solvent such as chloroform, and has poor solubility in general-purpose organic solvents. Also, a material having more excellent heat resistance is required.

Means to Solve the Problems

The present inventors found out that, by the presence of a silylenephenylene group in which an alkyl group having a relatively great carbon number is bound to Si in a repeated unit of polysilylenephenylene, solubility in general-purpose organic solvents, and heat resistance are excellent, which resulted in completion of the present invention.

The present invention is as follows:

<1> Polycarbosilane comprising the following repeated unit [1].

[Chemical formula 1]

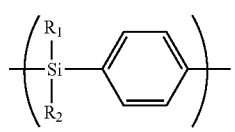

[1]

(wherein $R_1$ represents an C1-C6 alkyl group, $R_2$ represents an alkyl group having 2 or more carbon atoms, and $R_1$ and $R_2$ may be the same or different)

<2> The polycarbosilane according to the <1>, further comprising the following repeated unit [2], wherein a content of the repeated unit [1] is not less than 20 mol % relative to 100 mol % of a total of the repeated unit [1] and the repeated unit [2].

[Chemical formula 2]

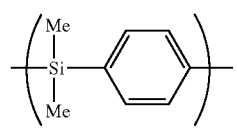

[2]

(wherein Me represents a methyl group)

<3> A method for producing polycarbosilane, comprising a step of reacting dialkyldihalogenosilane represented by the following general formula (1) and halogenated aryl represented by the following general formula (3).

[Chemical formula 3]

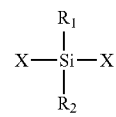

(1)

(wherein X represents a halogen atom, two Xs may be the same or different, $R_1$ represents an C1-C6 alkyl group, $R_2$ represents an alkyl group having 2 or more carbon atoms, and $R_1$ and $R_2$ may be the same or different)

[Chemical formula 4]

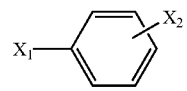

(3)

(wherein $X_1$ and $X_2$ represent a halogen atom, and may be the same or different, and a substitution position of $X_2$ may be any of ortho, meta and para relative to $X_1$)

<4> The method for producing polycarbosilane according to the <3>, further comprising a step of filtering a solution in which polycarbosilane is dissolved in an organic solvent, with an ionic filter.

<5> The method for producing polycarbosilane according to the <3>, wherein the dialkyldihalogenosilane is used with dimethyldihalogenosilane represented by the following general formula (2), and a reaction is performed so that a reaction charging ratio of the dialkyldihalogenosilane is not less than 0.2 (mole/mole) based on a total amount of the dialkyldihalogenosilane and the dimethyldihalogenosilane.

[Chemical formula 5]

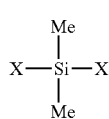

(2)

(wherein Me represents a methyl group, X represents a halogen atom, and two Xs may be the same or different)

<6> The method for producing polycarbosilane according to the <5>, further comprising a step of filtering a solution in which polycarbosilane is dissolved in an organic solvent, with an ionic filter.

Effect of the Invention

Since polycarbosilane of the present invention is excellent in solubility in general-purpose organic solvents due to possession of a specified repeated unit, it is easily applied as a heat-resistant material to various utilities. In addition, since the polycarbosilane is also excellent in heat resistance, it is preferable in a fiber, a thermosetting resin composition and the like. Particularly, when a content of a repeated unit [1] is not less than 20 mol % relative to 100 mol % of a total of the repeated unit [1] and a repeated unit [2], a 5% weight loss temperature (Td5) under the nitrogen atmosphere can be not lower than 350° C., and heat resistance is further excellent.

According to the method for producing polycarbosilane of the present invention, the polycarbosilane can be easily produced. Therefore, polycarbosilane which is inexpensive, and is excellent in solubility in general-purpose organic solvents, and heat resistance is provided.

In addition, when the method comprises a step of filtering a solution in which polycarbosilane is dissolved in an organic solvent with an ionic filter, a concentration of a metal component can be easily reduced to 5 ppb or lower, and the polycarbosilane is particularly useful as an insulating material.

BEST MODE FOR CARRYING OUT THE INVENTION

1. Polycarbosilane

Figure 1:
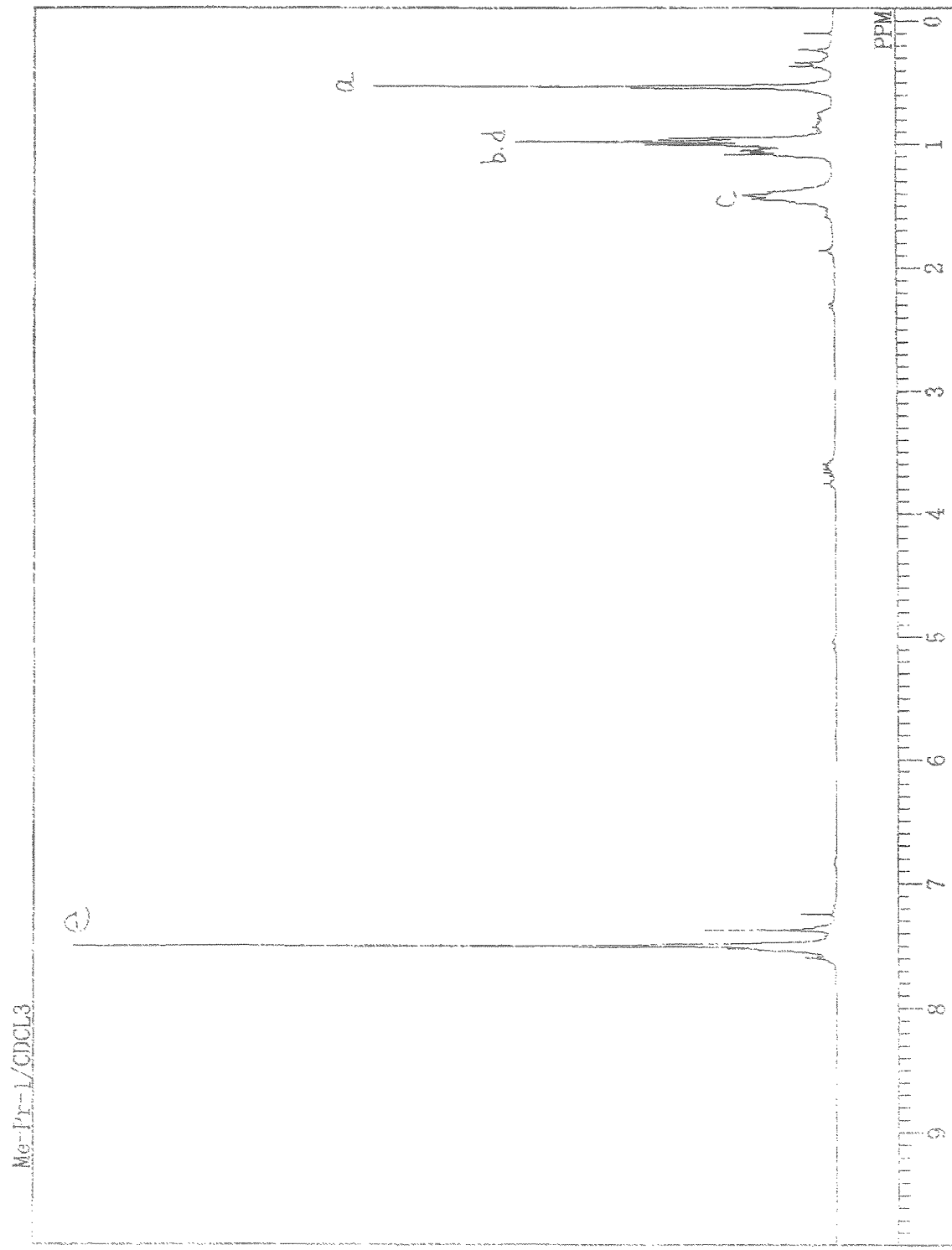
FIG. 1 shows $^1$H-NMR spectrum of carbosilane obtained in Example 1.

The polycarbosilane of the present invention comprises the following repeated unit [1].

[Chemical formula 6]

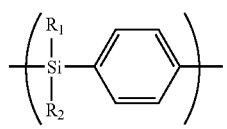

[1]

(wherein $R_1$ represents an C1-C6 alkyl group, $R_2$ represents an alkyl group having 2 or more carbon atoms, and $R_1$ and $R_2$ may be the same or different)

In the repeated unit [1], examples of $R_1$ include methyl, ethyl, propyl, butyl, pentyl and hexyl. In addition, $R_2$ is usually C2-C6 alkyl group.

$R_1$ and $R_2$ may be the same or different and, when they are the same, propyl group and the like are preferable.

Polycarbosilane of the present invention may be a polymer consisting only of one kind of a repeated unit [1], or may be a polymer containing two or more kinds.

Polycarbosilane of the present invention may further comprise the following repeated unit [2].

[Chemical formula 7]

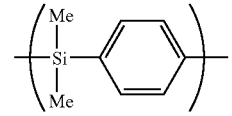

[2]

(wherein Me represents a methyl group)

When polycarbosilane of the present invention comprises both of repeated units [1] and [2], a constitutional ratio of both of them is not particularly limited. A content of the repeated unit [1] is preferably not less than 20 mol %, more preferably not less than 30 mol % and less than 100 mol %, further preferably not less than 50 mol % and less than 100 mol % relative to 100 mol % of a total of the repeated unit [1] and the repeated unit [2]. Since as a content of the repeated unit [1] is greater, heat resistance is excellent, solubility in general-purpose organic solvents such as tetrahydrofuran, prolylene glycol monomethyl ether acetate, propylene glycol dimethyl ether, methyl isobutyl ketone, methyl ethyl ketone and the like is excellent, and a highly concentrated solution can be prepared, polycarbosilane becomes preferable in extensive utilities.

When polycarbosilane of the present invention comprises both of repeated units [1] and [2], a polymer structure may be any of a random type and a block type.

The polycarbosilane may be a polymer consisting of each one kind of repeated units [1] and [2], may be a polymer comprising two or more kinds of one of them, or may be a polymer comprising two or more kinds of both of them.

A weight average molecular weight Mw of polycarbosilane of the present invention is usually 2,000 to 10,000. When this Mw is too small, heat resistance tends to be inferior in heat resistance.

A ratio of Mw and a number average molecular weight Mn, Mw/Mn (polydispersity) is 1.5 to 5.

Mw and Mn can be measured by gel permeation chromatography (GPC).

2. Method for Producing Polycarbosilane

The method for producing polycarbosilane of the present invention comprises a step of reacting dialkyldihalogenosilane represented by the following general formula (1) and halogenated aryl represented by the following general formula (3) (hereinafter, also referred to as "reaction step").

[Chemical formula 8]

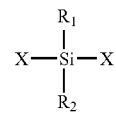

(1)

(wherein X represents a halogen atom, two Xs may be the same or different, $R_1$ represents an C1-C6 alkyl group, $R_2$ represents an alkyl group having 2 or more carbon atoms, and $R_1$ and $R_2$ may be the same or different)

[Chemical formula 9]

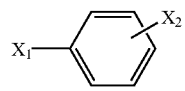

(3)

(wherein $X_1$ and $X_2$ represent a halogen atom, and may be the same or different, and a substitution position of $X_2$ may be any of ortho, meta and para relative to $X_1$)

As $R_1$ and $R_2$ in the general formula (1), $R_1$ and $R_2$ in the repeated unit [1] can be applied as they are.

X in the general formula (1) is a halogen atom, and examples include chlorine atom, bromine atom and iodine atom. Two Xs may be the same or different.

Examples of the dialkyldihalogenosilane represented by the general formula (1) include methylpropyldichlorosilane, methylisopropyldichlorosilane, dipropyldichlorosilane, methylbutyldichlorosilane, dibutyldichlorosilane, di-t-butyldichlorosilane, methylpentyldichlorosilane, dipentyldichlorosilane, methylhexyldichlorosilane, methyl(2-ethylbutyl)dichlorosilane, ethyl(2-ethylbutyl)dichlorosilane, dihexyldichlorosilane and the like. Among them, methylpropyldichlorosilane represented by the following formula (5) is preferable. These may be used alone, or may be used by combining two or more kinds.

[Chemical formula 10]

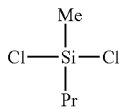

(5)

(wherein Me represents a methyl group, and Pr represents a propyl group)

When only dialkyldihalogenosilane represented by the general formula (1) is used in a reaction step, polycarbosilane consisting only of the repeated unit [1] is obtained.

In the present invention, by using both of dialkyldihalogenosilane represented by the general formula (1) and dimethyldihalogenosilane represented by the following general formula (2), polycarbosilane comprising repeated units [1] and [2] can be obtained.

[Chemical formula 11]

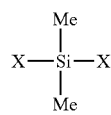

(2)

(wherein Me represents a methyl group, X represents a halogen atom, and two Xs may be the same or different)

Examples of the dimethyldihalogenosilane represented by the general formula (2) include dimethyldichlorosilane, dimethyldibromosilane and the like. Among them, dimethyldichlorosilane represented by the following formula (4) is preferable. These may be used alone, or may be used by combining two or more kinds.

[Chemical formula 12]

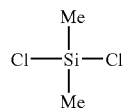

(4)

(wherein Me represents a methyl group)

When both of dialkyldihalogenosilane represented by the general formula (1) and dimethyldihalogenosilane represented by the general formula (2) are used, they are used so that a reaction charging ratio of the dialkyldihalogenosilane is preferably not less than 0.2 (mole/mole), more preferably not less than 0.3 (mole/mole), further preferably not less than 0.5 (mole/mole) based on a total amount of the dialkyldihalogenosilane and the dimethyldihalogenosilane.

Next, $X_1$ and $X_2$ in the general formula (3) are a halogen atom, and examples include a chlorine atom, a bromine atom, and an iodine atom. $X_1$ and $X_2$ may be the same or different, and a substitution position of $X_2$ may be any of ortho, meta and para relative to $X_1$.

Examples of halogenated aryl represented by the general formula (3) include 1,2-dichlorobenzene, 1,3-dichlorobenzene, 1,4-dichlorobenzene, 1,2-dibromobenzene, 1,3-dibromobenzene, 1,4-dibromobenzene, 1,2-diiodobenzene, 1,3-diiodobenzene, 1,4-diiodobenzene and the like. Among them, dibromobenzene represented by the following formula (6) is preferable. These may be used alone, or may be used by combining two or more kinds.

[Chemical formula 13]

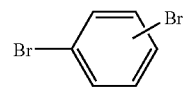

(6)

A preferable method of production in the reaction step comprises following four stages.

Process [1]: Magnesium and an organic solvent are added to a reaction vessel, this is activated, for example, with dibromoethane, a separately prepared solution [a solution obtained by mixing compounds represented by the general formulas (1), (2) and (3) in an organic solvent] is added dropwise to the activated solution in the reaction vessel to perform a Grignard reaction.

Process [2]: After completion of the reaction, ethers and water are added to dissolve a produced magnesium salt in water, thereby, a solution of two layers (organic layer/aqueous layer) is obtained.

Process [3]: After the organic layer is washed with an aqueous solution of an acid such as hydrochloric acid and the like, and washing with water is performed until the aqueous layer becomes neutral, and the organic layer is dried.

Process [4]: After an organic solvent is desolvated, an oligomer (low-molecular components) is removed to obtain polycarbosilane.

Examples of the organic solvent used in the Process [1] include ethers such as tetrahydrofuran, diethyl ether, diisopropyl ether, dibutyl ether and the like. Among them, tetrahydrofuran is most preferable due to easy reaction control. These may be used alone, or may be used by combining two or more kinds.

From the Process [1], a main chain skeleton of polysilylenephenylene can be constructed from compounds represented by the general formulas (1), (2), and (3).

Examples of ethers used in the Process [2] include tetrahydrofuran, diethyl ether, diisopropyl ether, dibutyl ether and the like. Among them, diisopropyl ether is preferable.

As hydrochloric acid and the like used in the Process [3], acid having a concentration of usually 0.1 to 3N is used.

When an oligomer is removed (removal of low-molecular components) in the Process [4], a solution of the reaction product is placed into alcohols such as methanol, ethanol, n-propanol, i-propanol, butanol and the like; a hydrocarbon-based solvent such as pentane, n-hexane and the like to dissolve low-molecular components, which are separated from objective polycarbosilane.

Polycarbosilane obtained after the Process [4] usually contains metal components such as Na, Mg, Al, K and the like at a concentration of 10 to 100 ppb by mass, respectively. Therefore, it is preferable that a step of filtering a solution prepared by dissolving the resulting polycarbosilane in an organic solvent such as propylene glycol dimethyl ether and the like with an ionic filter (hereinafter, also referred to as "filtering step") is provided immediately before and/or immediately after the Process [4].

As this ionic filter, a commercially available filter can be used. By this filtering step, a concentration of a metal component can be easily reduced to 5 ppb or lower. Polycarbosilane having a low metal component concentration is particularly useful as an insulating material.

Polycarbosilane of the present invention may comprise the repeated unit [1] or the repeated unit [1] and the repeated unit [2] obtained by reacting dialkyldihalogenosilane represented by the general formula (1), or the dialkyldihalogenosilane and dimethyldihalogenosilane represented by the general formula (2), as well as halogenated aryl represented by the general formula (3) so that a reaction charging ratio of the dialkyldihalogenosilane becomes not less than 0.2 (mole/mole) based on a total amount of the dialkyldihalogenosilane and the dimethyldihalogenosilane. The aforementioned description can be applied to a method for producing the polycarbosilane.

EXAMPLES

The present invention will be specifically explained below by way of Examples, but the present invention is not limited to only these Examples.

1. Production of Polycarbosilane

Example 1

Methylpropyldichlorosilane:dimethyldichlorosilane=10:0

A reaction vessel equipped with a dropping funnel, a magnetic stirrer and a condenser was charged with 36.0 g of magnesium (1,480 mmol) and 120 g of tetrahydrofuran, and the mixture was stirred at room temperature. Thereafter, 1.0 milliliter of 1,2-dibromoethane was added to the reaction vessel to activate magnesium. Then, a separately prepared solution (in which 160.4 g of 1,4-dibromobenzene (680 mmol) and 106.8 g of methylpropyldichlorosilane (680 mmol) were dissolved in 280 g of tetrahydrofuran) was added dropwise slowly from the dropping funnel. Heat production was confirmed and, at completion of addition, an oil bath (100° C.) was set, and heating under refluxing was performed for 3 hours. Thereafter, it was confirmed that a raw material disappeared by gas chromatography.

After aging at room temperature overnight in the nitrogen atmosphere, 400 g of diisopropyl ether and 400 g of pure water were added to the reaction solution to dissolve a magnesium salt, and a total amount of the reaction solution was transferred to a separatory funnel. Then, the aqueous layer was separated, and the organic layer was washed with 400 g of a 1N—HCl aqueous solution. Thereafter, the organic layer was washed with 400 g of pure water five times. The aqueous layer was washed with water until it became neutral.

The organic layer was recovered, and anhydrous magnesium sulfate was added to dehydrate the organic layer. Thereafter, the solvent was distilled off under reduced pressure, and the reaction product (resin) was dissolved in 40 g of tetrahydrofuran. Then, this solution was added dropwise to 800 g of isopropyl alcohol, and oligomer components were removed to obtain a pale yellow viscous substance. A yield was 73%.

This pale yellow viscous substance was measured by $^1$H-NMR (270 MHz), a spectrum shown in FIG. 1 was obtained, and it was seen that the substance is a polymer compound having the following repeated unit. A δ value in the spectrum of FIG. 1 and assignment thereof are shown in Table 1.

In addition, by GPC, Mw=3,900 and Mw/Mn=2.3 were obtained.

TABLE 1

[Chemical formula 14]

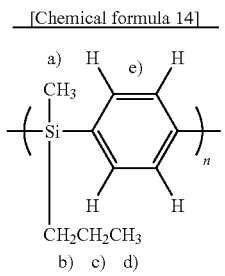

| Measuring method | δ (ppm) | Assignment |
|---|---|---|
| $^1$H-NMR | 0.5 | a) |
| | 0.8-1.1 | b) and d) |
| | 1.4 | c) |
| | 7.5 | e) |

Example 2

Methylpropyldichlorosilane:dimethyldichlorosilane=10:0

According to the same manner as that of Example 1 except that 46.8 g of magnesium (1,925 mmol), 210.0 g of 1,4-dibromobenzene (890 mmol) and 139.8 g of methylpropyldichlorosilane (890 mmol) were charged in raw material charging in Example 1, synthesis was performed. A yield was 80%.

For the resulting polymer compound, Mw=4,000 and Mw/Mn=1.9 were obtained.

Example 3

Methylpropyldichlorosilane:dimethyldichlorosilane=7:3

According to the same manner as that of Example 1 except that 9.0 g of magnesium (370 mmol), 40.0 g of 1,4-dibromobenzene (170 mmol), 18.7 g of methylpropyldichlorosilane (119 mmol), and 6.6 g of dimethyldichlorosilane (51 mmol) were charged in raw material charging in Example 1, synthesis was performed. A yield was 38%.

For the resulting polymer compound, Mw=5,400 and Mw/Mn=1.9 were obtained.

Example 4

Methylpropyldichlorosilane:dimethyldichlorosilane=3:7

According to the same manner as that of Example 1 except that 9.0 g of magnesium (370 mmol), 40.0 g of 1,4-dibromobenzene (170 mmol), 8.0 g of methylpropyldichlorosilane (51 mmol), and 15.4 g of dimethyldichlorosilane (119 mmol) were charged in raw material charging in Example 1, synthesis was performed. A yield was 58%.

For the resulting polymer compound, Mw=5,500 and Mw/Mn=1.9 were obtained.

Comparative Example 1

Methylpropyldichlorosilane:dimethyldichlorosilane=0:10

A reaction vessel equipped with a dropping funnel, a magnetic stirrer and a condenser was charged with 9.0 g of magnesium (370 mmol) and 30 g of tetrahydrofuran, and the mixture was stirred at room temperature. Thereafter, 0.25 milliliter of 1,2-dibromoethane was added to the reaction vessel to activate magnesium. Then, a separately prepared solution (in which 40.0 g of 1,4-dibromobenzene (170 mmol) and 21.8 g of dimethyldichlorosilane (170 mmol) were dissolved in 70 g of tetrahydrofuran) was slowly added dropwise from the dropping funnel. Heat production was confirmed, and at completion of addition, an oil bath (100° C.) was set, and heating under refluxing was performed for 3 hours. Thereafter, it was confirmed that a raw material disappeared by gas chromatography.

After aging overnight, 100 g of diisopropyl ether and 100 g of pure water were added to the reaction solution to dissolve a magnesium salt, and a total amount of the reaction solution was transferred to a separatory funnel. Then, the aqueous layer was separated, and the organic layer was washed with 100 g of a 1N—HCl aqueous solution. Thereafter, the organic layer was washed with 100 g of pure water five times. The aqueous layer was washed with water until it became neutral.

The organic layer was recovered, and anhydrous magnesium sulfate was added to dehydrate the organic layer. Thereafter, the solvent was distilled off under reduced pressure, and the reaction production (resin) was dissolved in 40 g of tetrahydrofuran. Then, this solution was added dropwise to 800 g of isopropyl alcohol, and oligomer components were removed to obtain a pale yellow viscous substance. A yield was 20%.

For the resulting polymer compound, Mw=3,300 and Mw/Mn=3.5 were obtained.

Comparative Example 2

Methylpropyldichlorosilane:dimethyldichlorosilane=1:9

A reaction vessel equipped with a dropping funnel, a magnetic stirrer and a condenser was charged with 9.0 g of magnesium (370 mmol) and 30 g of tetrahydrofuran, and the mixture was stirred at room temperature. Thereafter, 0.25 milliliter of 1,2-dibromoethane was added to the reaction vessel to activate magnesium. Then, a separately prepared solution (in which 40.0 g of 1,4-dibromobenzene (170 mmol), 2.67 g of methylpropyldichlorosilane (17 mmol) and 19.8 g of dimethyldichlorosilane (153 mmol) were dissolved in 70 g of tetrahydrofuran) was slowly added dropwise from the dropping funnel. Heat production was confirmed, and at completion of addition, an oil bath (100° C.) was set, and heating under refluxing was performed for 3 hours. It was confirmed that a raw material disappeared by gas chromatography.

After aging overnight, 100 g of diisopropyl ether and 100 g of pure water were added to the reaction solution to dissolve a magnesium salt, and a total amount of the reaction solution was transferred to a separatory funnel. Then, the aqueous layer was separated, and the organic layer was washed with 100 g of a 1N—HCl aqueous solution. Thereafter, the organic layer was washed with 100 g of pure water five times. The aqueous layer was washed with water until it became neutral.

The organic layer was recovered, and anhydrous magnesium sulfate was added to dehydrate the organic layer. Thereafter, the solvent was distilled off under reduced pressure, and the reaction product (resin) was dissolved in 40 g of tetrahydrofuran. Then, this solution was added dropwise to 800 g of isopropyl alcohol, oligomer components were removed, thereby, a pale yellow viscous substance was obtained. A yield was 20%.

For the resulting polymer compound, Mw=3,900 and Mw/Mn=1.8 were obtained.

2. Assessment of Polycarbosilane

Example 5

Assessment of Solubility in Organic Solvent

Ten milligram of polycarbosilane obtained in any of Examples 1 to 4 and Comparative Examples 1 to 2 was mixed with 90 mg of various kinds of organic solvents, and solubility at 25° C. was observed with naked eyes to perform assessment.

Results are summarized in the Table 2. Meanings of abbreviations representing organic solvents are as follows.

THF: Tetrahydrofuran

PGMEA: Propylene glycol monomethyl ether acetate

PGDM: Propylene glycol dimethyl ether

MIBK: Methyl isobutyl ketone

MEK: Methyl ethyl ketone

TABLE 2

| | THF | Diisopropyl ether | Chloroform | PGMEA | PGDM | MIBK | MEK |
|---|---|---|---|---|---|---|---|
| Example 1 | ○ | ○ | ○ | ○ | ○ | ○ | ○ |
| Example 2 | ○ | ○ | ○ | ○ | ○ | ○ | ○ |
| Example 3 | ○ | ○ | ○ | ○ | ○ | ○ | ○ |
| Example 4 | ○ | Δ | ○ | Δ | ○ | ○ | ○ |
| Comparative Example 1 | ○ | X | ○ | X | X | X | X |
| Comparative Example 2 | ○ | X | ○ | X | X | X | X |

○: Soluble, Δ: Partially soluble, X: insoluble

Example 6

The product obtained in Example 1 was dissolved in PGDM to a concentration of 20% by weight, and this was filtered with a 0.2 μm membrane filter, and filtered with an ionic filter. Concentrations of Na, Mg, Al and K at each stage were measured by ICP-MS, and results are shown in Table 3.

TABLE 3

| Metal species | Before filtration | After filtration with 0.2 μm membrane filter | (Unit; ppb) After filtration with ionic filter |
|---|---|---|---|
| Na | 36 | 59 | <5 |
| Mg | 29 | 18 | <5 |
| Al | 16 | 9 | <5 |
| K | 20 | 25 | <5 |
| Ca | 14 | 18 | 11 |
| Fe | 27 | 29 | 6 |

Ionic filter: "DFA1SRPSW44" manufactured by Pall Corporation (flow rate; 100 g/30 sec)

As apparent from Table 3, by using an ionic filter, a concentration of each metal of Na, Mg, Al and K could be reduced to lower than 5 ppb by weight.

Example 7

The product obtained in Example 1 was subjected to thermogravimetry, and a temperature at which 5% of an initial weight is lost (5% weight loss temperature Td5) was measured under the nitrogen atmosphere and the air atmosphere. This Td5 was measured by raising a temperature from a room temperature at a temperature raising rate of 10° C./min using a thermogravimetric/differential thermal analyzer (manufactured by Seiko Instruments Inc.,).

As a result, Td5 was 377° C. under the nitrogen atmosphere, and 378° C. in the air.

Example 8

The product obtained in Example 4 was subjected to thermogravimetry, and a temperature at which 5% of an initial weight is lost (5% weight loss temperature Td5) was measured.

As a result, Td5 was 375° C. under the nitrogen atmosphere 374° C. in the air.

As apparent from results of Examples 7 and 8, polycarbosilane of the present invention has excellent heat resistance.

The invention claimed is:

1. A polycarbosilane comprising repeat unit [1] and repeat unit [2], wherein a content of the repeat unit [1] is not less than 20 mol % relative to 100 mol % of a total of the repeat unit [1] and the repeat unit [2],

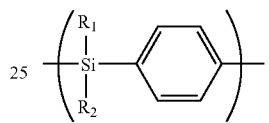

[1]

wherein
$R_1$ represents an C1-C6 alkyl group,
$R_2$ represents an alkyl group having 2 or more carbon atoms, and
$R_1$ and $R_2$ are different; and

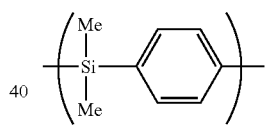

[2]

wherein Me represents a methyl group.

2. The polycarbosilane according to claim 1, wherein a content of repeat unit [1] is not less than 50 mol % and less than 100 mol % relative to 100 mol % of a total of repeat unit [1] and repeat [2].

3. The polycarbosilane according to claim 1, wherein a content of the repeat unit [1] is not less than 30 mol % relative to 100 mol % of a total of the repeat unit [1] and the repeat unit [2], and wherein $R_2$ represents an alkyl group having 3 or more carbon atoms.

4. The polycarbosilane according to claim 1, wherein $R_1$ is selected from the group consisting of a methyl group, a ethyl group, a propyl group, a butyl, group, a pentyl group, and a hexyl group.

5. The polycarbosilane according to claim 1, wherein $R_1$ is a methyl group.

6. The polycarbosilane according to claim 1, wherein $R_2$ is a $C_2$-$C_6$-alkyl group.

7. The polycarbosilane according to claim 1, wherein $R_2$ is a $C_3$-$C_6$-alkyl group.

8. A method for producing polycarbosilane, comprising:
reacting at least one dialkyldihalogenosilane represented by general formula (1), at least one dimethyldihalogenosilane represented by general formula (2), and at least one halogenated aryl represented by general formula (3);

wherein a reaction charging ratio of the dialkyldihalogenosilane is not less than 0.2 (mole/mole) based on a total amount of the dialkyldihalogenosilane and the dimethyldihalogenosilane;

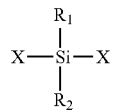
(1)

wherein
X represents a halogen atom,
two Xs may be the same or different,
$R_1$ represents an C1-C6 alkyl group,
$R_2$ represents an alkyl group having 2 or more carbon atoms, and
$R_1$ and $R_2$ are different;

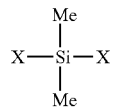
(2)

wherein Me represents a methyl group, X represents a halogen atom, and two Xs may be the same or different; and

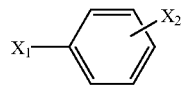
(3)

wherein
$X_1$ and $X_2$ represent a halogen atom, and may be the same or different, and a substitution position of $X_2$ may be any of ortho, meta and para relative to $X_1$.

9. The method according to claim 8, further comprising filtering a solution in which polycarbosilane is dissolved in an organic solvent with an ionic filter.

10. The method according to claim 9, wherein a concentration of sodium is less than 5 ppb by weight upon said filtering.

11. The method according to claim 8, wherein a reaction charging ratio of the dialkyldihalogenosilane is not less than 0.5 (mole/mole) based on a total amount of the dialkyldihalogenosilane and the dimethyldihalogenosilane.

12. The method according to claim 8, wherein said at least one dialkyldihalogenosilane represented by general formula (1) is at least one member selected from the group consisting of methylpropyldichlorosilane, methylisopropyldichlorosilane, dipropyldichlorosilane, methylbutyldichlorosilane, dibutyldichlorosilane, di-t-butyldichlorosilane, methylpentyldichlorosilane, dipentyldichlorosilane, methylhexyldichlorosilane, methyl(2-ethylbutyl)dichlorosilane, ethyl(2-ethylbutyl)dichlorosilane, and dihexyldichlorosilane.

13. The method according to claim 8, wherein said at least one dialkyldihalogenosilane represented by general formula (1) is methylpropyldichlorosilane.

14. The method according to claim 8, wherein
said at least one dialkyldihalogenosilane represented by general formula (1) is methylpropyldichlorosilane,
said at least one dimethyldihalogenosilane represented by general formula (2) is dimethyldichlorosilane, and
said at least one halogenated aryl represented by general formula (3) is dibromobenzene.

15. The method according to claim 14, wherein said dibromobenzene is at least one of o-dibromobenzene, m-dibromobenzene, and p-dibromobenzene.

16. An insulating material, comprising repeat unit [1] and repeat unit [2],
wherein a content of the repeat unit [1] is not less than 20 mol % relative to 100 mol % of a total of the repeat unit [1] and the repeat unit [2], and a concentration of sodium is not higher than 5 ppb;

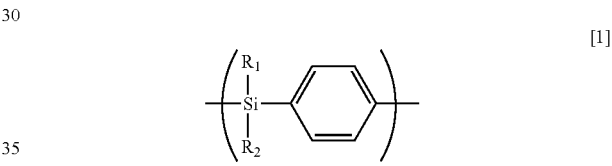
[1]

wherein
$R_1$ represents an C1-C6 alkyl group,
$R_2$ represents an alkyl group having 2 or more carbon atoms, and
$R_1$ and $R_2$ are different; and

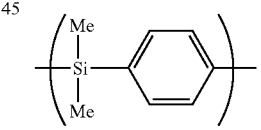
[2]

wherein Me represents a methyl group.

* * * * *